Inventors:
Carl A. Piercy,
Robert S. Kent,
by Harry E. Dunham
Their Attorney.

Nov. 21, 1950　　C. A. PIERCY ET AL　　2,531,156
METHOD OF INSULATING HOLLOW CORE CONDUCTORS
Filed April 17, 1945　　2 Sheets-Sheet 2
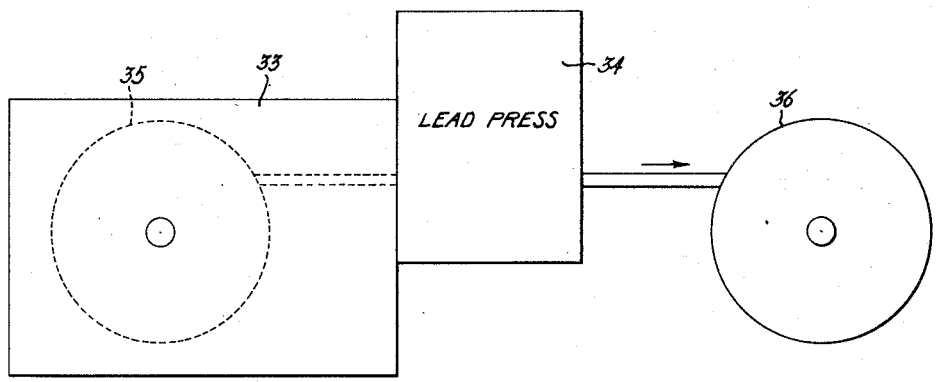
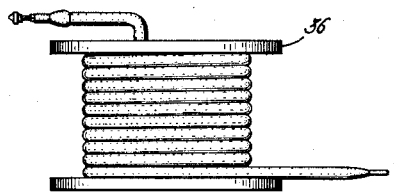
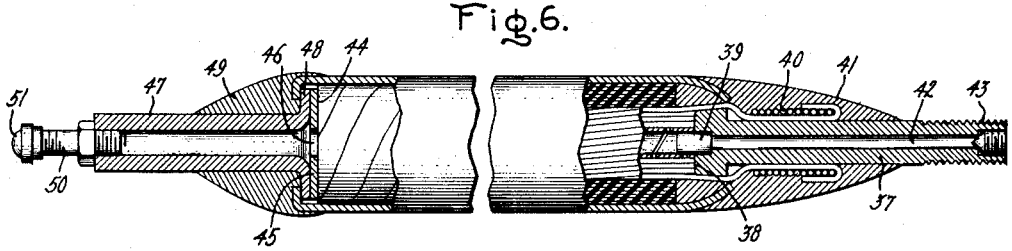
Inventors:
Carl A. Piercy,
Robert S. Kent,
by Harry E. Dunham
Their Attorney.

Patented Nov. 21, 1950

2,531,156

UNITED STATES PATENT OFFICE 2,531,156

METHOD OF INSULATING HOLLOW CORE CONDUCTORS

Carl A. Piercy, Ballston Lake, and Robert S. Kent, Schenectady, N. Y., assignors to General Electric Company, a corporation of New York Application April 17, 1945, Serial No. 588,742

2 Claims. (Cl. 117—61)

Our invention relates to a method and apparatus for manufacturing electric cables, more particularly gas-filled cables of the single conductor type.

One object of our invention is to provide a new and improved method of manufacturing gas-filled cable of the type having a hollow core conductor.

Another object of our invention is to provide a new and improved apparatus for manufacturing a gas-filled cable of the type described.

Figure 1:
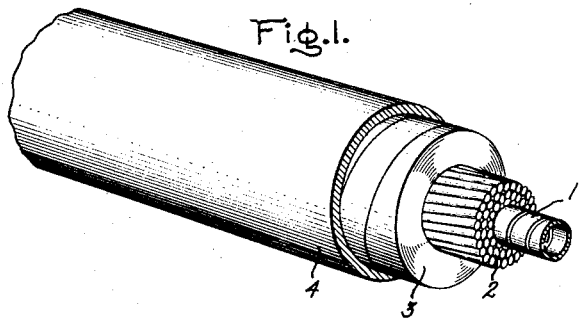
Figure 2:
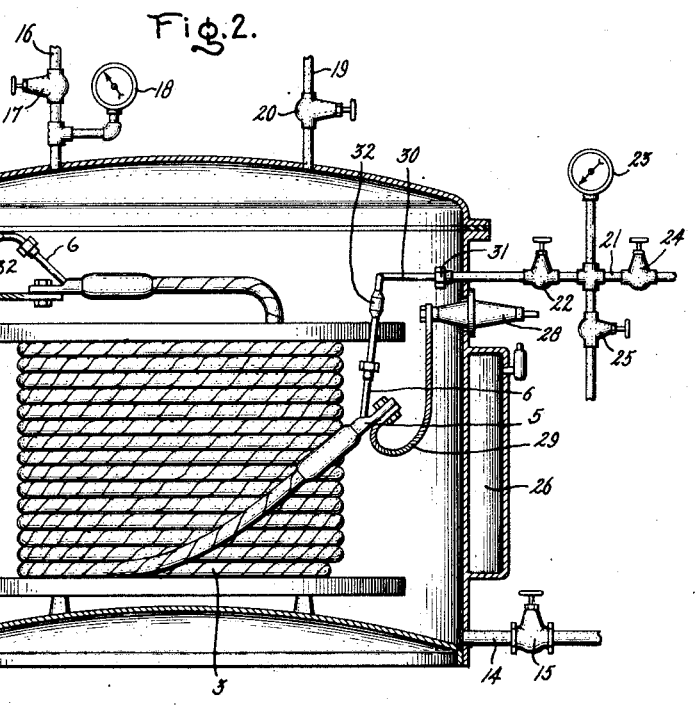
Figure 3:
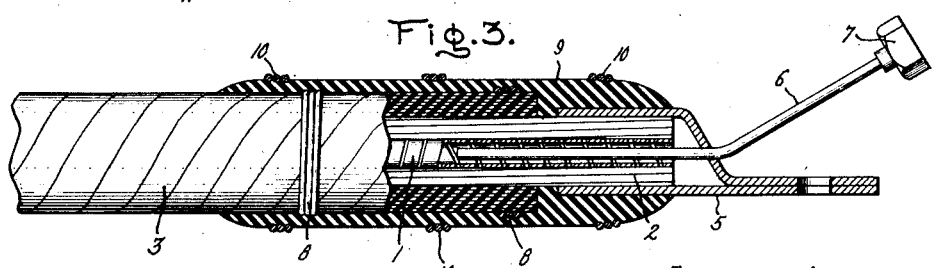

In the accompanying drawing, Fig. 1 is a perspective view of a cable manufactured in accordance with our invention; Fig. 2 is a sectional view of an impregnating tank and associated apparatus used in our method of manufacture; Fig. 3 is a sectional view of an end seal applied to the cable during manufacture; Fig. 4 is a schematic view of the lead coating machine; Fig. 5 is a view of a commercial length of cable wound on a reel, and Fig. 6 is a view of the ends of the cable, partly in section, showing the construction of the end seals which are used during shipment and installation of the cable.

Referring to Fig. 1 of the drawing, we have shown a gas-filled cable of the type in which a gas channel is provided in the core of the conductor. The gas channel is formed as an open spiral tube 1 over which the strands of the conductor 2 are laid in a longer pitch spiral. The conductor is insulated by any suitable fibrous insulation adapted to receive an impregnating material, the thickness of the insulation depending upon the rating of the cable. Usually, the insulation is applied in the form of a plurality of paper tapes 3 spirally wound around the conductor by a taping machine in a manner well known in the art. The applied paper tapes are then vacuum dried and impregnated under heat with an insulating compound. After suitable treatment, in a manner to be described later, the cable length is run through a lead press and the lead sheath 4 applied. It should be manifest that the cable can be provided with shielding tapes between the insulation and the conductor and also between the insulation and the lead sheath, such arrangements being widely known in the cable field and forming no part of the present invention.

In field installations, gas is supplied by means of suitable joints to the gas channel of the cable comprising the hollow tube 1. The gas pressure easily passes through the open spirals of the tube, the interstices of the stranded conductor and permeates the minute spaces between the layers of paper insulation. The gas forms a sealing and healing dielectric medium in the paper insulation. It is preferable to use a neutral gas, such as nitrogen, so that the impregnating material and paper insulation are not adversely affected. For low pressure gas cable, the gas is maintained at pressures ranging from 12 to 20 lbs. per square inch. However, if it is desired to increase the capacity of the cable, the gas pressures may be raised to higher ranges of the order of 150 lbs. per square inch or more. In such instances, the lead sheath should be provided with a reinforcing armor of any suitable type now used in cable constructions.

Heretofore in commercial use, single conductor gas-filled cables have been constructed with a gas channel between the paper insulation and the lead sheath. Such an arrangement is shown in Patent 2,253,984, issued on October 26, 1941 to George B. Shanklin. While single conductor cables constructed in accordance with the teachings of the patent have been very satisfactory in use, a cable such as we have described has the advantage that it is of smaller diameter for a given capacity, thereby making the cable more flexible and more suitable for installation in small ducts. Moreover, such a cable may be built at lower cost due to a saving in material.

In an article by George B. Shanklin entitled "Low Gas-Pressure Cable" appearing in Electrical Engineering for July 1939, vol 58, page 309, there is described a test length of single conductor gas-filled cable having a hollow core, the construction being of the same general type as that illustrated in Fig. 1. In constructing such a test length of cable, the cable insulation was dried and impregnated under vacuum and heat and then the core was blown free of compound by applying gas pressure to one end of the cable. During the tests, the cable was operated under the approximately 10 lbs. gas pressure.

While a cable constructed in this manner was satisfactory for test purposes in the short lengths ordinarily used in such tests, for example 50 ft., it was found that the method of manufacture was not entirely suitable for making a hollow conductor gas-filled cable in commercial lengths of 400 ft. or more. Blowing through the cable was not sufficient to remove all excess compound remaining after the impregnating process. There was a tendency for a certain amount of the impregnating material to be held in the interstices of the conductor strands. Later this compound would seep out due to the normal heating of the cable during load cycles and clog the gas channel. Also the compound would tend to migrate to low spots in the cable which would occur if such a cable were to be installed over ground having a rugged profile. For these reasons, single conductor gas-filled cable for commercial use was heretofore constructed with the gas channel between the lead sheath and insulation since, as far as we are aware, it was not feasible to construct a hollow core gas-filled cable in commercial lengths due to manufacturing problems in removing excess compound from long cable lengths.

Our invention contemplates a method of manufacture which makes it possible to remove all excess compound from the interstices of the conductor strands and also any excess compound from the paper insulation itself irrespective of the length of the cable. The method is well suited for use in making cable in commercial lengths. To this end, we subject the length of cable to a predetermined pressure for a predetermined length of time, after blowing out the gas channel, and prior to application of the lead sheath, so that the cable construction is freed of any excess impregnating compound. We have found that it is possible to force the excess compound outwardly through the small interstices in the conductor and cable insulation along the entire length of the cable. The process prevents the formation in use of all slugs of insulating compound in the cable core.

In manufacturing the cable according to our invention, the strands of the conductor are first spiraled around the open spiral tube 1 and then the layers of paper insulation are applied in the form of a plurality of paper tapes. The tapes are applied untreated and impregnated later. The partially completed length of cable thus formed is provided with an end seal at each end to facilitate processing of the cable through the succeeding steps in manufacture.

In constructing the end seal, shown by Fig. 3, the paper insulation is cut back from the end of the conductor and an electric terminal 5 is placed over the end of the stranded conductor and is fastened thereto in any suitable way as by means of a soldered joint. The electric terminal is provided for making an electrical connection with the cable so that electric current may be used to heat the cable during the drying and impregnating steps. A hollow tube 6 extends through the terminal 5 into the hollow core of the conductor. The tube 6 is sealed to the terminal 5 with an air-tight seal such as a soldered joint. The tube 6 is used to supply gas under pressure to the cable core during the succeeding steps in manufacture. A coupling member 7 mounted on the tube 6 is used to connect the tube to a source of gas pressure.

The severed ends of the paper tapes are held in position by spaced servings 8 of cotton cord, or the like. In order to provide a gas-tight seal between the electric terminal 5 and the cable, a covering 9 is applied over the end of the cable and over the terminal 5. It is possible to construct the covering 9 of self-vulcanizing rubber tapes which are wound back and forth until a sufficiently strong and adequate seal is provided. Alternatively, the cover may be premolded and then applied to the cable end and electric terminal. Windings 10 of coton cord or fine wire hold the covering fast to the electric terminal and cable wrappings. The servings 8 which hold the paper tapes in position also serve to provide a frictional grip between the cover 9 and the paper tapes.

Each end of the cable is provided with an end seal of the type described. The construction is such that gas under pressure may be supplied to the hollow cable core while at the same time an electric current may be passed through the conductor of the cable. After the end seals are placed on the cable, the drum carrying the length of cable is placed in an impregnating tank for the next steps in the method of manufacture.

The impregnating tank 11 is constructed to form a container for the cable reel with the cable thereon and for the liquid impregnating material with which the tank is to be filled. A valve 12 is inserted in a pipe line 13 adjacent the lower left hand wall of the tank for feeding insulating compound into the tank. A drain pipe 14 on the opposite side is controlled by a hand valve 15. At the top of the tank a pipe line 16 is controlled by a hand valve 17 for placing the tank under vacuum. A combined pressure and vacuum gauge 18 is inserted in the pipe line 16 to measure the pressure or vacuum existing in the impregnating tank during the various steps of manufacture. A neutral drying gas, such as nitrogen or carbon dioxide, may be fed to the tank through a pipe line 19 controlled by a valve 20.

A gas supplying means for supplying a neutral gas under pressure to opposite ends of the cable is mounted on opposite sides of the tank. The structure includes a pipe line 21 mounted in the wall of the tank which may be shut off or turned on by a hand valve 22. A pressure gauge 23 is carried by the pipe line 21 for measuring the amount of gas pressure applied to the cable core. Gas is applied to the pipe line 21 through a control valve 24. It may be drained from the pipe line through a valve 25. It will be apparent that by properly operating the valves 24 and 25, the gas pressure may be applied to one end of the cable or the other. As will appear later, this application of gas pressure is used to blow out the cable core.

The impregnating tank is heated by means of a surrounding heating chamber 26, the heating medium being controlled by a hand valve 27. Either steam or hot water may be used to heat the tank. Conversely, during steps in the manufacture when it is desired to cool the cable, a cooling liquid, such as cold water, may be circulated through the chamber 26. Insulated terminal blocks 28 are carried on opposite sides of the tank for supplying electric current to the cable conductor.

After the cable reel, with the cable wound thereon, is placed in the impregnating tank, a conductor 29 is connected between the cable terminal 5 and the terminal block 28 on the side wall of the tank. This connection is made at both ends of the cable. The gas supply tube 6 secured to the cable end is connected to the gas supplying means of the impregnating tank by means of a tube 30 fastened in position by the coupling unions 31. Since during the impregnating process, the cable terminal 5 is at an electrical potential, the tube 30 is provided with an insulating portion 32, which may be formed of a hollow glass seal, or the like. This insulates the live ends of the cable from the impregnating tank.

The impregnating tank is now sealed and placed under vacuum by operation of the hand valve 17. At the same time, a suitable heating medium is admitted to the chamber 26 and an electric current is passed through the conductor of the cable to heat it. The partially formed cable is dried under heat and vacuum at temperatures of approximately 100 to 120° C. for a time period which may range from 6 hours to as many as 50 hours or more depending upon the length of the cable mounted on the reel and the thickness of the paper insulation. The purpose of this drying and vacuum treatment is to remove all impurities, such as air, gases, or moisture, from the cable insulation and also from the interstices of the conductor. After the vacuum drying operations are completed, compound is admitted by opening the hand valve 12 with vacuum on tank and cable. The compound floods the chamber to a depth greater than the height of the cable reel.

The insulating compound is viscous and has a good film tension so that it is held in the paper by capillary action. The particular compound used forms no part of our present invention. It may be one now commonly used in the manufacture of gas-filled cables of the type now on the market. For example, one suitable compound having a relatively low viscosity is an insulating oil having a Saybolt viscosity of 5000 at 30° C. and 95 at 100° C. and a pour point of minus 50 C. In accordance with accepted cable practices, a compound having a higher viscosity may be used, for example, a mixture of high grade insulating oil and rosin in the proportion of 80% oil and 20% rosin having a viscosity of 215 at 100° C. The compounding operation is carried on for a time sufficient to insure complete and thorough impregnation of the paper tapes. After the cable has been properly impregnated, it is cooled down to approximately 90 to 95° C., or some predetermined temperature, and then the vacuum in the tank is broken by the admission of nitrogen gas through the inlet pipe 19. The insulating compound is then drained from the tank by opening hand valve 15.

The vacuum is now reapplied by closing hand valve 20 and opening valve 17 and the cable is cooled down to approximately 55 to 60° C. The cable is held under vacuum for a time interval sufficient to permit excess compound to drain from the cable insulation. The drainage time depends upon the length of the cable and the thickness of the insulation. During this period, a portion of the excess compound will drain out of the cable but a relatively large amount of the compound will remain within the strands of the conductor, within the open spirals of the hollow core and also in the interstices in the paper tapes.

In order to remove compound slugs from the hollow core of the cable, the vacuum in the tank is broken by the admission of nitrogen gas through the inlet pipe 19 and then nitrogen gas under a predetermined pressure is applied to the hollow core of the cable from either one of the gas supplying pipes 21 connected to the cable core. For example, the valves 22 and 24 on the left hand side of the tank are opened to supply nitrogen gas under pressure to that end of the cable and then the valves 22 and 23 at the other end of the cable are opened to reduce the gas pressure at that end of the cable to atmospheric pressure. Depending upon the length of the cable wound on the reel, the nitrogen gas pressure is applied to the cable core at pressures ranging from 10 to 100 lbs. per square inch or more. The gas under pressure forces any compound slugs in the cable core to be blown outwardly from one end of the cable to the other. When the compound ceases to flow out of one end of the cable, the flow of gas pressure through the cable is reversed by appropriate manipulation of the valves so that the hollow core of the cable is blown out from the other end. If necessary, this blowing operation may be repeated several times until the core of the cable is blown free of slugs of insulating compound.

While the blowing out steps just described are effective in removing part of the compound slugs floating in the interior of the cable core, it has been found that such a process is not sufficient to entirely remove the excess compound from the open spirals of the cable core or from the interstices in the strands of the conductor. In order to remove this excess compound, the cable is subjected to a gas pressure along its entire length for a considerable time, the pressure being applied to both ends of the cable.

The valves 22 and 24 are opened to admit nitrogen gas under pressure to both ends of the cable core. At the same time, the impregnating tank may be placed under vacuum or may be placed under a lower gas pressure than the pressure supplied to both ends of the cable. In other words, a differential pressure is obtained between the cable core and the exterior of the paper insulation. The difference in pressure forces any excess compound existing in the cable strands and in the open spiral core outwardly through the paper insulation to complete the draining of the cable. It has been found in actual practice that the excess compound will pass through the interstices of the paper insulation and drain from the exterior surfaces of the paper tapes. Also, any excess compound in the paper insulation itself, which was not removed during the draining process, will be removed by the application of gas pressure. The differential pressure applied between the cable core and the exterior of the cable may be of any chosen value depending upon the length of the cable wound on the reel and the thickness of the paper insulation. Also, the time during which the cable is subjected to the pressure will vary in accordance with the thickness of the paper insulation and the pressure at which the neutral gas is applied.

During the time that the cable is being subjected to a differential pressure between the core and the exterior of the paper tapes, electric current may be passed through the conductor to heat and to maintain the cable temperature at approximately 55 to 60° C. This assists in complete drainage of excess compound from the cable.

It has been found that it is possible to control accurately the amount of drainage of compound from the cable by means of this differential pressure method. Depending upon the viscosity of the insulating compound and the amount of compound which it is desired to have remain in the cable, it is possible to drain the cable so that it is substantially dry to the touch or so that a slight oozing of the compound from the cable still exists. It is preferred to drain the cable to an extent such that it is substantially dry to the touch. However, a slight amount of compound is left in the cable sufficient to migrate between the paper tapes to act with the gas in the cable to heal any damage caused by ionization in use.

In order to determine whether or not the hollow core is free of compound after the final processing, a gas flow test may be used to determine the amount of neutral gas which will flow through the cable from one of the inlet pipes 21 to the other. This gas flow may be measured by any conventional flow meter of a type now on the market. If the gas flow test indicates that a small amount of compound still remains in the cable core, the cable may be subjected to the differential pressure for a further period of time in order to drain the excess compound.

After the cable has been completely drained of excess compound to the desired extent, the cable is cooled down before the application of the lead sheath. A final gas flow test is given the cable after it is cooled down and before it is removed from the tank to make sure that no oil slugs have collected in the cable core which did not show up at the higher temperature to which the cable was subjected during draining. If necessary, the cable may be blown out with nitrogen gas at high pressure from one end to the other in the manner already described.

During the leading operation shown schematically by Fig. 4, the cable is placed in an enclosure 33 containing an inert gas, such as nitrogen. This prevents any moisture or air from contaminating the cable prior to leading. The enclosure is arranged immediately adjacent the lead press 34 and is sealed thereto so that the cable passes directly from the inert atmosphere to the lead press without exposing the cable to atmosphere. The cable is pulled from the reel 35, passes through the lead press, and is rewound on the take-up reel 36.

In order to provide a means for sealing the end of the gas-filled cable during shipment and to provide a structure for securing a pull rod to the cable end, one end of the cable is provided with an end seal as shown in the right hand portion of Fig. 6. A portion of the insulation is stripped back and a pull bolt 37 inserted under a few of the conductor strands. The remaining strands of the conductor are cut off as indicated at 38 to provide a flush surface which abuts the end of the pull bolt 37. A tube or ferrule 39 is inserted in a recess in the end of the bolt and extends a short distance into the open spiral tube, forming the hollow core of the cable. This protects the severed end of the spiral tube. The conductor strands which surround the head of the pull bolt 37 are fastened in position by means of binding wires 40 so that the conductor is firmly secured to the bolt. A wipe soldered joint 41 joins the lead sheath of the cable to the pull bolt. It provides a mechanical bond between the lead sheath and the pull bolt and also serves to seal the bolt to the cable end. The bolt is provided with a channel 42 through which gas pressure may be applied to the cable, the channel being closed by a threaded plug 43.

At its opposite end, the cable is cut off to provide a flat surface 44 and a disk 45 provided with a center opening 46 is placed against the flat severed end of the cable. In this position, the disk protects the severed end of the cable from damage. A hollow pipe 47 having a flared end 48 abuts against the disk 45 and the pipe is fastened to the lead sheath by means of a wipe soldered joint 49 which seals the end of the cable to the pipe. A valve 50 is fastened in the end of the pipe and is used to supply inert gas to the cable. The valve is closed by a cap 51. Fig. 5 shows the cable mounted on the reel 36, the ends of the cable being provided with the end seals just described.

By following the steps in our process, it is possible to manufacture a hollow core gas-filled cable wherein substantially all danger of the core becoming clogged with compound is removed. The cable may be easily manufactured in any chosen length suitable for handling with available equipment.

What we claim as new and desire to secure by Letters Patent of the United States is:

1. In the processing of a cable having a fluid pervious hollow core stranded conductor covered with a liquid absorbing and fluid pervious insulation, the steps which comprise subjecting the cable to vacuum and heat to remove air and other impurities from the insulation and from the interstices of the hollow core conductor, subjecting the cable under vacuum conditions to an impregnating compound having electric insulating characteristics and a viscosity sufficiently low so as to be capable of flowing into the insulation under such vacuum conditions, draining under lowered temperature conditions excess compound from the cable, applying gas under pressure to one end of the conductor core with the other end open to the atmosphere to force residual slugs of insulating compound out of the other end of the core and then closing said other end of the hollow core to create a higher pressure in the core than exists exterior of the insulation so as to force excess impregnating compound radially outwardly through the stranded conductor and insulation along the length of the cable.

2. The processing of a cable having a liquid pervious hollow core stranded conductor covered with fibrous insulation which comprises the steps of passing an electric current through the cable to raise the temperature thereof, simultaneously subjecting the cable to vacuum to remove air and other impurities from the insulation and from the hollow core conductor, submerging the cable under vacuum conditions in an impregnating liquid having electric insulating characteristics and a Saybolt viscosity at 100° C. ranging from 95 to 215 for a period of time sufficient to allow complete impregnation of the cable insulation under such vacuum conditions, reducing the cable temperature, draining excess liquid from the cable while under the reduced temperature conditions, applying gas under pressure to one end of the conductor core with the other end open to atmosphere to force residual slugs of insulating compound out of the other end of the core and then closing said other end of the hollow core to create a higher pressure therein than exists exterior of the cable so as to force excess liquid retained in the conductor radially outwardly through the insulation along the length of the cable.

CARL A. PIERCY.
ROBERT S. KENT.

REFERENCES CITED

The following references are of record in the file of this patent:

UNITED STATES PATENTS

| Number | Name | Date |
|---|---|---|
| 1,009,731 | Fisher | Nov. 28, 1911 |
| 1,025,763 | Von Pindtershofen | May 12, 1912 |
| 1,864,674 | Schur | June 28, 1932 |
| 1,893,590 | Mau et al. | Jan. 10, 1933 |
| 1,918,344 | Mau et al. | July 18, 1933 |
| 1,956,722 | Kennedy | May 1, 1934 |
| 2,097,501 | Reichelt | Nov. 2, 1937 |
| 2,100,587 | Chalker | Nov. 30, 1937 |
| 2,155,980 | Reichelt | Apr. 25, 1939 |
| 2,175,373 | Baker | Oct. 10, 1939 |
| 2,228,766 | Johnson | Jan. 14, 1941 |
| 2,390,823 | Bennett | Dec. 11, 1945 |

FOREIGN PATENTS

| Number | Country | Date |
|---|---|---|
| 551,454 | Great Britain | Feb. 23, 1943 |
| 553,669 | Great Britain | June 1, 1943 |